United States Patent
Takechi et al.

(10) Patent No.: US 7,039,890 B2
(45) Date of Patent: May 2, 2006

(54) INTEGRATED CIRCUIT LAYOUT METHOD AND PROGRAM THEREOF PERMITTING WIRE DELAY ADJUSTMENT

(75) Inventors: Akihisa Takechi, Kawasaki (JP); Shogo Tajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/361,524

(22) Filed: Feb. 11, 2003

(65) Prior Publication Data
US 2003/0177464 A1    Sep. 18, 2003

(30) Foreign Application Priority Data
Mar. 15, 2002  (JP)  ............... 2002-071512

(51) Int. Cl.
*G06F 17/50*  (2006.01)
(52) U.S. Cl. .......................... 716/11; 716/12
(58) Field of Classification Search ............... 716/7–12
See application file for complete search history.

(56) References Cited

U.S. PATENT DOCUMENTS 6,710,449 B1 * 3/2004 Hyoto et al. ............ 257/758
6,751,785 B1 * 6/2004 Oh ............................ 716/10
6,815,811 B1 * 11/2004 Ozawa et al. ............ 257/691
2002/0184606 A1 * 12/2002 Ohba et al. ............... 716/11
2003/0107134 A1 * 6/2003 Lee .......................... 257/758

* cited by examiner

Primary Examiner—Vuthe Siek
Assistant Examiner—Naum Levin
(74) Attorney, Agent, or Firm—Staas & Halsey LLP

(57) ABSTRACT

An integrated circuit layout method comprising the steps of: laying out a plurality of circuit elements and a plurality of connecting wires connecting the circuit elements, on a chip; generating dummy patterns in regions that lie at an interval of a first distance from the connecting wires; and changing the first distance to a second distance that differs from the first distance, with respect to a part of connecting wires among said plurality of connecting wires. After layout, when a timing inspection is carried out by finding the delay values of the connecting wires through consideration of the dummy patterns, it is possible, with respect to a connecting wire of a path exhibiting a timing error, to adjust the separation distance to the dummy patterns (the width of the dummy pattern prohibition region) to thereby correct the delay value of this wiring path.

8 Claims, 9 Drawing Sheets

US 7,039,890 B2

INTEGRATED CIRCUIT LAYOUT METHOD AND PROGRAM THEREOF PERMITTING WIRE DELAY ADJUSTMENT

CROSS-REFERENCE TO RELATED APPLICATIONS

This application is based upon and claims the benefit of priority from the prior Japanese Patent Application No. 2002-71512, filed on Mar. 15, 2002, the entire contents of which are incorporated herein by reference.

BACKGROUND OF THE INVENTION

1. Field of the Invention

The present invention relates to an integrated circuit layout method and a program thereof, and more particularly to an integrated circuit layout method and a program thereof that permit wire delay adjustment by employing dummy patterns.

2. Description of the Related Art

Integrated circuit design includes a logic design step and a layout step. The logic design step is a step of designing a circuit having desired functions by connecting circuit elements such as the circuit components, the cells, the function macros, and the like, and a net list comprising the circuit elements and the data for connecting same is generated, according to the logic design. The layout step is a step of arranging the circuit elements and connecting wires on the chip in accordance with the net list, and involves the generation of layout data (physical data), that is, pattern data for mask generation.

FIG. 1 is a flowchart for a conventional layout step. The circuit elements in the net list, such as the cells and macros, and the wires connecting these circuit elements, as well as the supply wiring, are laid out on the chip (S10). Then, the resistance and capacitance, and the like, of the connecting wires thus laid out are extracted from the layout data, and the delay time of each connecting wire is calculated from the corresponding CR value and from the delay time characteristic of the circuit elements (S12). Timing inspection, which involves using the calculated delay times to inspect the suitability of the timing of clocks and signals in the integrated circuit, is performed (S14). The layout step then ends provided there are no timing errors. However, if a timing error is present, it is necessary to repeat the process from layout step S10 (S16). In other words, the clock and critical path delay time is corrected by changing the wire width and length, and the like, of the path exhibiting a timing error, or by inserting a buffer at a midway point along the path.

However, the layout step S10, and the CR extraction and delay time calculation step S12 are very time-consuming, and, when a timing error arises in the timing inspection step, these steps need to be repeated, meaning that there is the problem that the turn-around time of the layout process as a whole is extended.

SUMMARY OF THE INVENTION

Accordingly, it is an object of the present invention to provide a layout method and a program thereof which permit the required path timing correction with no change or a minimal change to the post-layout layout data (physical data).

In order to achieve the above object, one aspect of the present invention is an integrated circuit layout method comprising the steps of: laying out a plurality of circuit elements and a plurality of connecting wires connecting the circuit elements, on a chip; generating dummy patterns in regions that lie at an interval of a first distance from the connecting wires; and changing the first distance to a second distance that differs from the first distance, with respect to a part of connecting wires among said plurality of connecting wires.

According to the above invention, after layout, when a timing inspection is carried out by finding the delay values of the connecting wires through consideration of the dummy patterns, it is possible, with respect to a connecting wire of a path exhibiting a timing error, to adjust the separation distance to the dummy patterns (the width of the dummy pattern prohibition region) to thereby correct the delay value of this wiring path. It is thus possible to perform the required path timing correction without changing the layout patterns (physical data) produced by the layout step.

According to a preferred embodiment, in the step of changing the first distance to the second distance, dummy patterns are re-generated in regions that lie at an interval of the second distance from said part of connecting wires, or those dummy patterns which lie at intervals up to the second distance from said part of connecting wires are deleted. The second distance is sometimes longer and sometimes shorter than the first distance.

DESCRIPTION OF THE PREFERRED EMBODIMENTS

An embodiment of the present invention will be described hereinbelow with reference to the drawings. However, the scope of protection of the present invention is not limited to or by the embodiment hereinbelow, but rather covers the inventions defined in the claims and any equivalents thereof.

As LSI miniaturization progresses, the problem of process non-uniformity which is dependent on the densities of the wiring patterns is generated. For example, in the dry etching step, in cases where wiring pattern densities are low, the actual wiring which is ultimately produced is of increased width, but in cases where wiring pattern densities are high, rather than increasing in width, the actual wiring is of a width that pertains to the design values. Stated simply, this phenomenon is attributable to the fact that the material produced in the dry etching step is deposited on the side walls of the wiring patterns. Further, in the multi-layered wiring formation step, there is a step of inserting an insulating film between wiring and performing chemical and mechanical polishing for an even finish. However, due to disparities in wiring pattern densities, non-uniformity is generated in this polishing step. Furthermore, it is also known that, as a result of the optical proximity effect in the exposure step, in cases where pattern densities are large and where pattern densities are small, the shapes of the post-development patterns differ from those of the exposure patterns.

In order to avoid the process non-uniformity that arises as a result of such wiring pattern densities, dummy patterns are generated between the provisionally laid out wiring patterns, to thereby make the pattern densities uniform.

Figure 2:
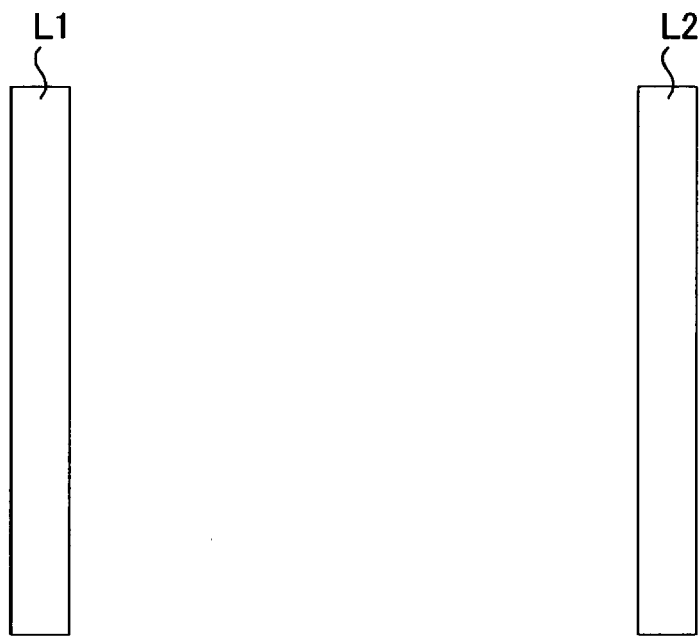
FIG. 2 serves to illustrate connecting wires.
Figure 2:
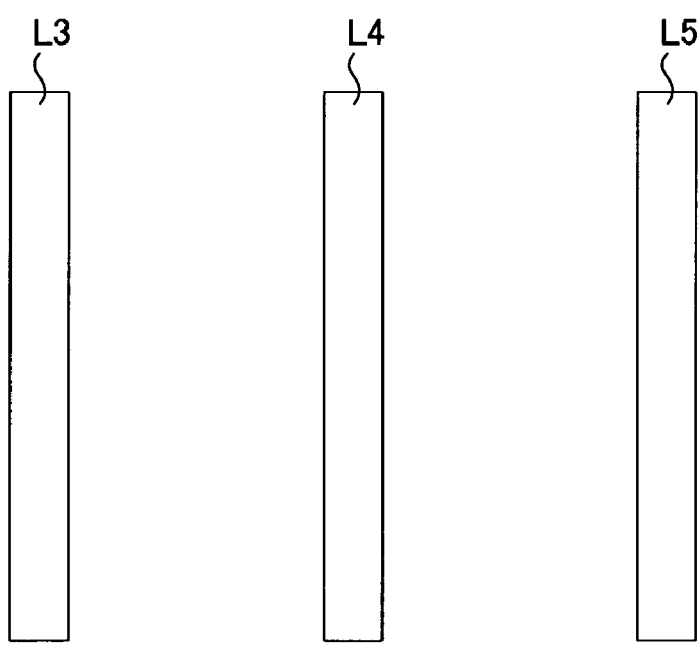
Figure 3:
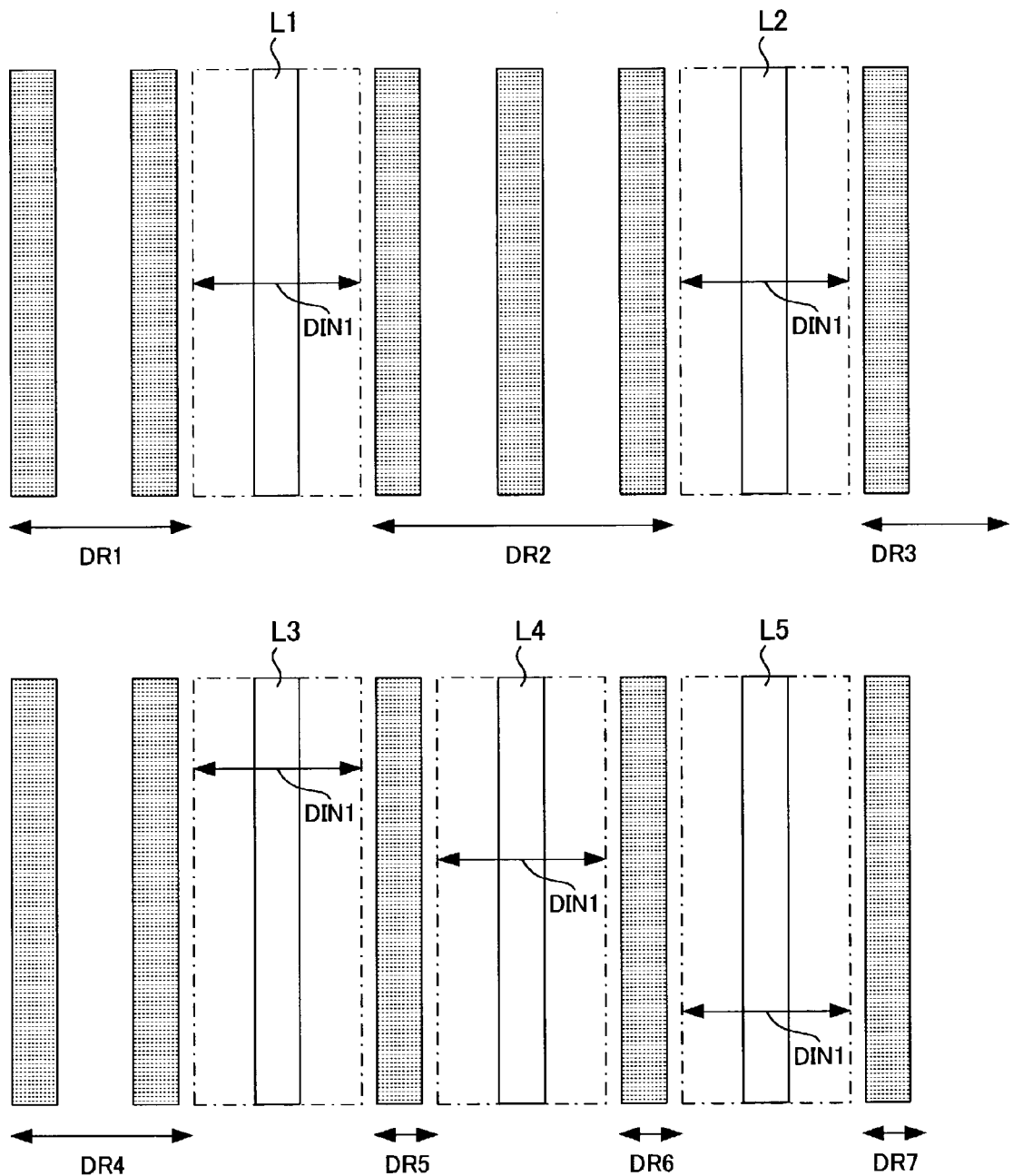
FIG. 3 serves to illustrate connecting wires and dummy patterns.
Figure 4:
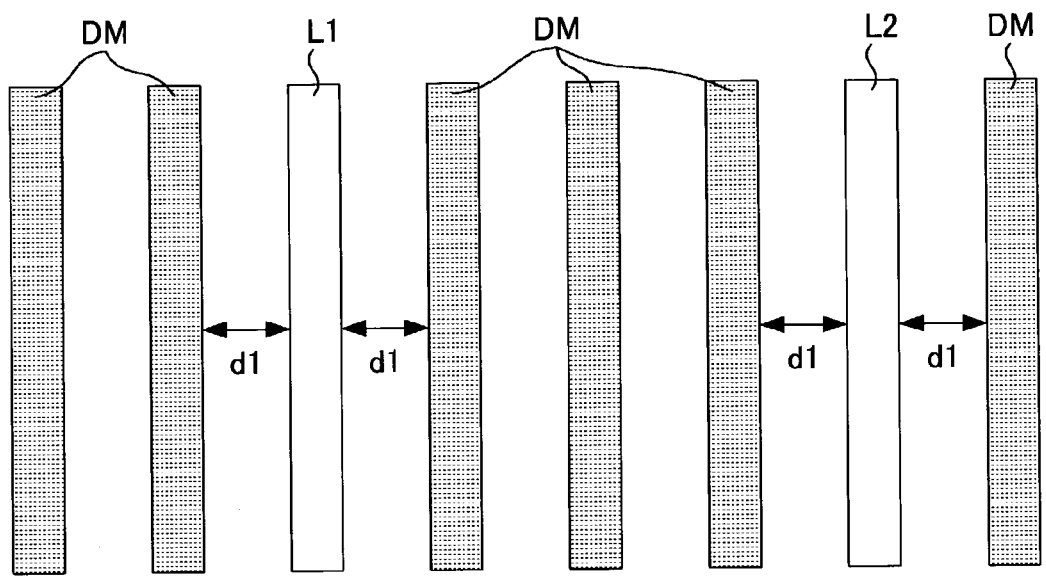
FIG. 4 serves to illustrate connecting wires and dummy patterns.
Figure 4:
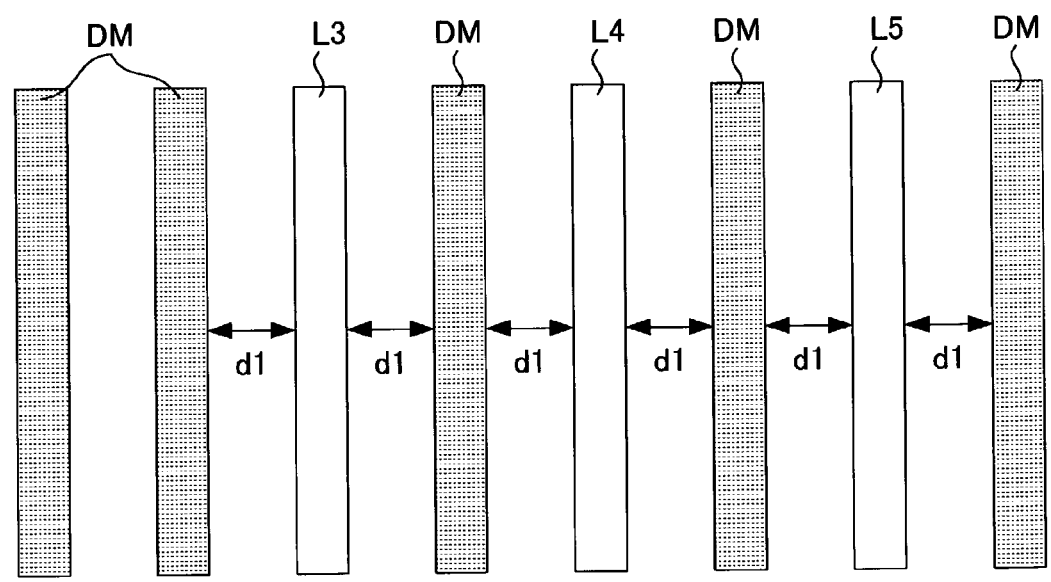

FIGS. 2, 3 and 4 serve to illustrate connecting wires and dummy patterns. FIG. 2 shows an example of laid out wiring patterns. Whereas the distance between the upper level wiring patterns L1, L2 is large and the pattern density is therefore low, the distance between the lower level wiring patterns L3, L4, L5 is small, and the pattern density is therefore high. When non-uniformity exists in such pattern densities, the process non-uniformity described above is produced. The pattern densities can therefore be made uniform by generating dummy patterns in the regions between the wiring patterns.

As shown in FIG. 3, double-sided regions that comprise (i.e., in which are disposed) the connecting wires L1 to L5 are designated as dummy pattern prohibition regions DIN 1, and the remaining regions are made the dummy pattern regions DR1 to DR7 in which dummy patterns are then generated. Alternatively, it is also possible to generate dummy patterns over the whole surface and then delete the dummy patterns which are in the dummy pattern prohibition regions DIN 1. As a result, as shown in FIG. 4, dummy patterns DM are generated between the connecting wires L1 to L5 and in positions that lie at an interval of a fixed distance d1 from the connecting wires. The pattern density is thus uniform irrespective of the wiring pattern densities, whereby process non-uniformity can be suppressed.

The shape of the dummy patterns shown in FIG. 4 is an example, other shapes also being possible. For example, a pattern produced by arranging a plurality of small squares in the form of a grid, and a pattern in which a plurality of stripes extend in a direction perpendicular to the connecting wires L1 to L5 are also acceptable.

Because such dummy patterns are created, the capacitance of the connecting wires constituting the clock and critical paths is dependent on the distance d1 to the neighboring dummy patterns. The capacitance of the connecting wires also differs in accordance with the shape of the dummy patterns, but the capacitance value is inversely proportional to the distance d1.

Therefore, in cases where a timing error is discovered upon carrying out a timing inspection after layout, the capacitance values of connecting wires of paths in which such errors are produced can be corrected by generating dummy patterns after adjusting the distance to the dummy patterns. A longer distance to the dummy patterns results in a smaller capacitance, and a shorter distance produces a larger capacitance. Moreover, as a result of changing the distance to the dummy patterns, the pattern density in the vicinity of this wiring also changes, and, accordingly, as a result of process non-uniformity (a process shift) in the actual wiring width that arises from the wiring pattern densities described above, the wiring width is also changed. This change in the wiring width signifies a change in the resistance value of the wiring.

As a result of changing the width of the dummy pattern prohibition regions in this manner, and thus adjusting the capacitance and resistance of the connecting wires, it is possible to adjust the delay amounts of these connecting wires to thereby avoid timing errors. In other words, according to the present embodiment, by using dummy patterns generated in order to alleviate the process non-uniformity due to miniaturization, it is possible to minutely adjust the delay amount of a connecting wire that exhibits a timing error or in which a timing error is probable.

Figure 5:
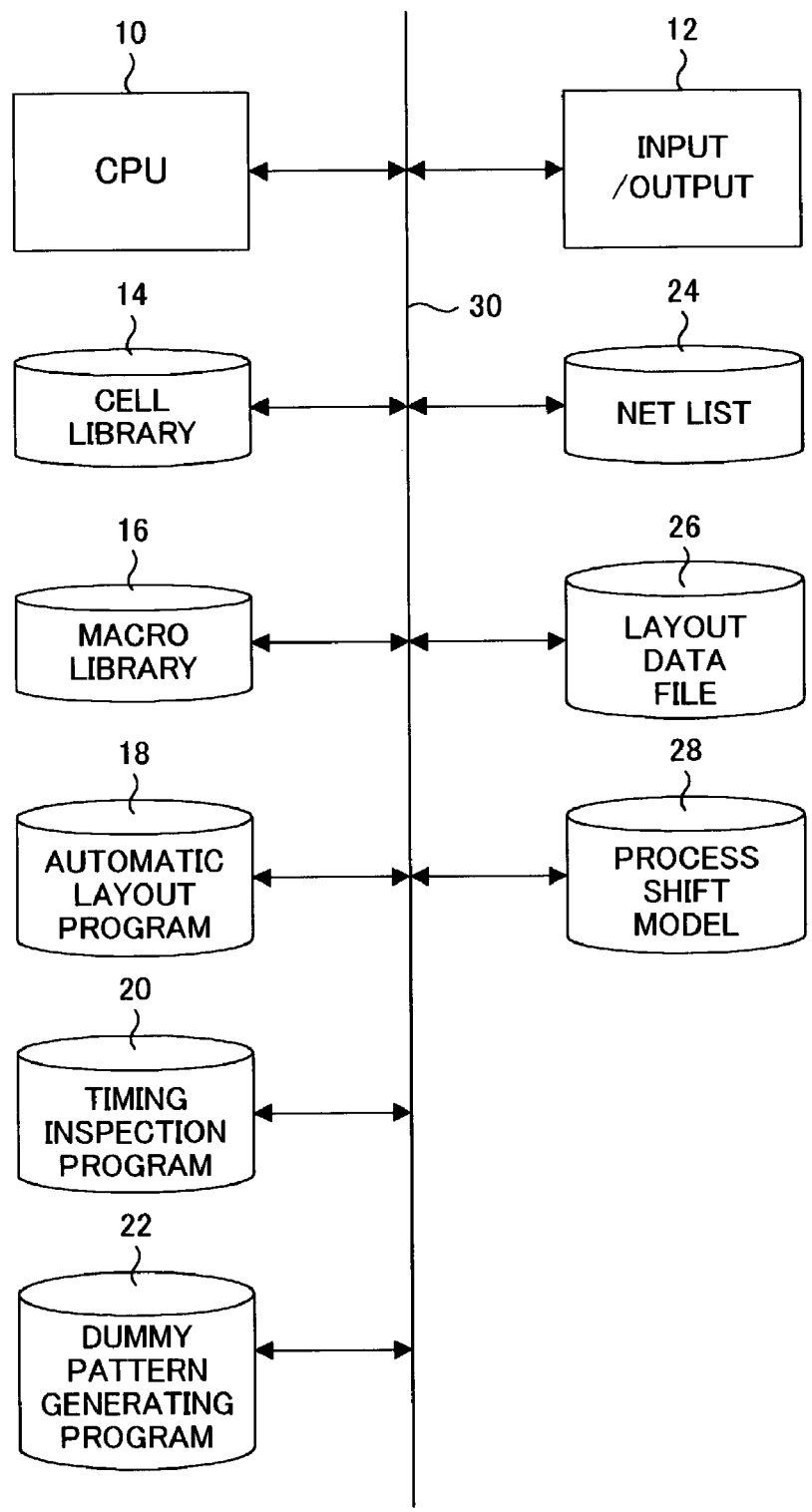
FIG. 5 is a constitutional view of the layout system according to the present embodiment.

FIG. 5 is a constitutional view of the layout system according to the present embodiment. The layout system comprises a generic computer system that comprises a CPU 10, which is a processing unit, and an input/output apparatus 12 such as a display and a keyboard, and the like. The generic computer system has a cell library 14, a macro library 16, an automatic layout program 18, a timing inspection program 20, and a dummy pattern generating program 22 installed thereon. Further, an LSI net list 24 for layout, a layout data file 26 generated by the layout, and a process shift model data file 28 which is referenced in the delay time adjustment step, and the like, are also stored in a file apparatus. These components of the layout system are connected via a bus 30 to the CPU 10 and the input/output apparatus 12, and the like.

The cell library 14 and macro library 16 contain layout data, which is the physical data for the cells, function macros, and the like, which constitute the circuit elements contained in the net list. At the time of performing layout using the layout program 18, when cells and function macros in the net list are arranged in predetermined positions, physical data in these libraries are registered in these positions, and a layout data file 26 is generated.

Figure 1:
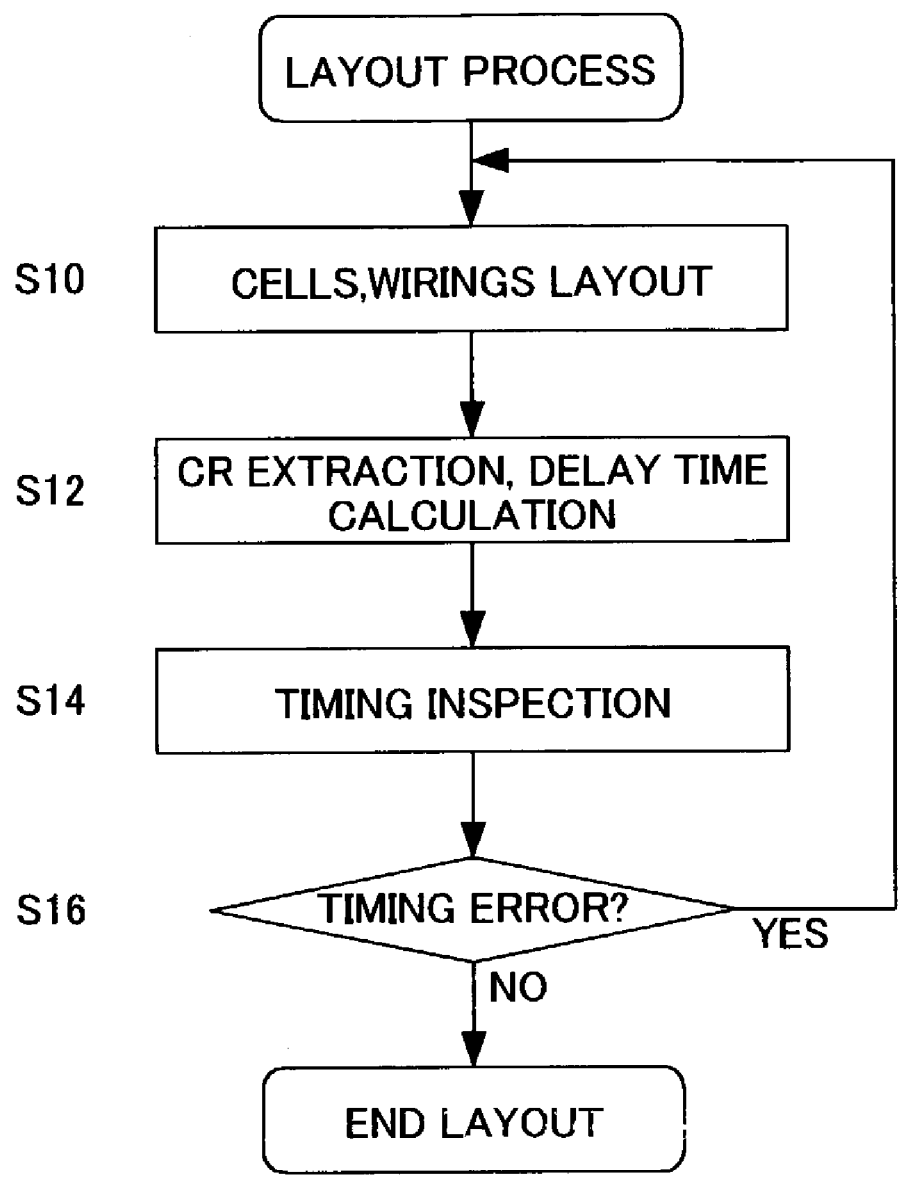
FIG. 1 is a flowchart for a conventional layout step.
Figure 6:
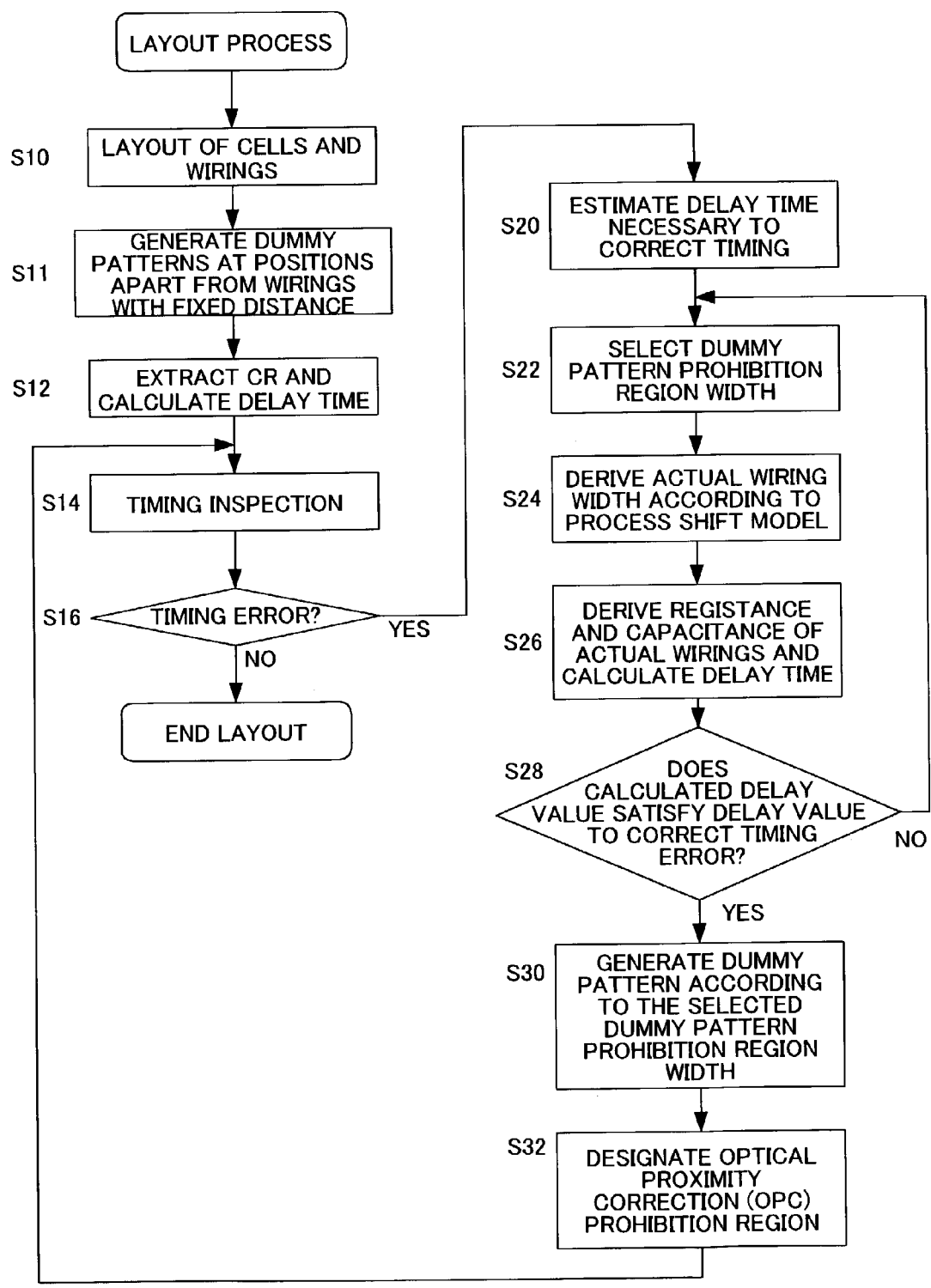
FIG. 6 is a flowchart for the layout process according to the present embodiment.

FIG. 6 is a flowchart for the layout process according to the present embodiment. Steps which are the same as those in FIG. 1 have been assigned the same step numbers. As a result of designating a net list generated in accordance with a logic design and running an automatic layout program, layout is performed of the circuit elements and the wires connecting these circuit elements, which are in the net list (S10). In response to an instruction from the operator, the layout program reads out the physical data of the selected circuit elements from the libraries 14, 16, and generates the layout data 26 so that the selected circuit elements are arranged in the selected positions. Furthermore, the layout program automatically generates the connecting wires between the circuit elements thus arranged or generates these connecting wires in response to an instruction from the operator. The data for these connecting wires is also added to the layout data 26. Further, the layout program also lays out required power supply wiring. A connecting wire pattern as shown in FIG. 2 is thus produced.

Thereafter, a timing pattern generating program 12 generates dummy patterns in positions that lie at an interval of the fixed distance d1 from the connecting wires (S11). This distance d1 affects the capacitance value of the connecting wires. Because the capacitance value is large when the distance is very small, the distance d1 is selected to permit the desired capacitance value to be obtained. Also, because the distance d1 also affects the overall pattern density, the distance d1 is selected so as to permit the desired pattern density to be obtained.

In the step of generating the dummy patterns, as described earlier in FIG. 3, by determining the dummy pattern prohibition regions DIN1 which comprise the connecting wire patterns L1 to L5 and which extend as far as the distance d1 on either side of these connecting wire patterns, dummy patterns are generated in the remaining regions DR1 to DR7. The data for the dummy patterns thus generated is added to the layout data file 26.

Thereafter, for the purpose of a timing inspection, connecting wire CR extraction is performed and path delay times are calculated (S12). In the CR extraction, the timing inspection program 20 calculates the distance to the wiring and the dummy patterns neighboring the connecting wires from the layout data, and calculates the capacitance values of these connecting wires from the corresponding areas. The resistance values are calculated from the width and thickness of the connecting wires. Further, the delay time of each wire is calculated from the CR values thus extracted and the delay time characteristics of the circuit elements, and so forth. In order to improve the accuracy of the capacitance values, the capacitance values of the connecting wires can also include the capacitance values with the wiring in the area around the connecting wires, in addition to the wiring which neighbors these connecting wires.

Further, the timing inspection program 20 uses the above determined delay times to carry out an inspection to determine whether or not the timing of the integrated circuit clocks and signals is appropriate (S14). Then, provided that no timing errors exist, the layout process ends. However, when a timing error is produced, it is necessary to perform correction of the delay time of the wire which corresponds to this timing error. A timing error is considered to have occurred in cases where the timing of clocks and signals, and the like is too early or late. Minute adjustment of the delay time of the path in accordance with the type and magnitude of the timing error is therefore required.

In the present embodiment, adjusting the distance to the dummy patterns with respect to a wiring pattern having a clock and signal path exhibiting a timing error corrects the wiring capacitance value, which permits adjustment of the delay time. Extending the distance to the dummy patterns makes it possible to reduce the capacitance of the wiring, and reducing the distance permits an increase in the capacitance of the wiring. The delay value required for the timing correction is therefore estimated in accordance with the timing error detected in the timing inspection (S20). The dummy pattern prohibition region width with respect to the connecting wire targeted for the adjustment is selected (S22). In the selection of this dummy pattern prohibition region width, the dummy pattern prohibition region width set in step S11 is minutely adjusted in accordance with the adjustment of the delay value required in the timing correction, for example.

Figure 7:
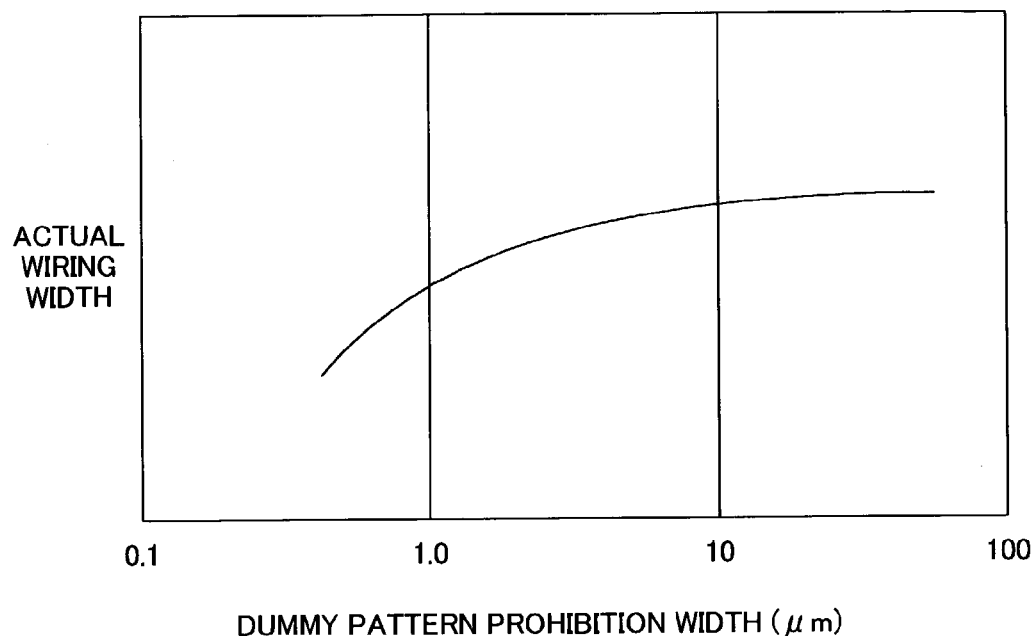
FIG. 7 is a graph showing one example of a process shift model.

Next, the layout program uses a process shift model to derive the actual wiring width corresponding to the selected dummy pattern prohibition region width (S24). FIG. 7 is a graph showing one example of a process shift model. The dummy pattern prohibition region width is plotted on the horizontal axis, and corresponds to the width DIN1 of the prohibition regions in FIG. 3 or to the distance d1 in FIG. 4. The width of the actual wiring after exposure, development and etching is plotted on the vertical axis. This program shift model is different for each connecting wire width, film thickness, and process line. That is, as described earlier, although process non-uniformity in accordance with the pattern density is produced, the dummy pattern prohibition region width and actual wiring width can be reproduced uniformly, meaning that it is possible to generate the model shown in FIG. 7 in advance by storing past data.

The layout program references the process shift model data 28 to derive the actual wiring width which corresponds to the selected dummy pattern prohibition region width (S24). Then, the layout program derives the resistance and capacitance of the actual wiring in accordance with the derived actual wiring width and the dummy pattern prohibition region width, to thereby calculate the delay time (S26). A check is performed of whether or not the calculated delay value satisfies the delay value required for the timing error correction (S28). When this delay value is thus satisfied, the dummy pattern generating program 22 re-generates the dummy pattern in accordance with the selected dummy pattern prohibition region width (S30). When this delay time is not satisfied, steps S22, S24, and S26 are repeated until the delay value of the actual wiring satisfies the delay value required for the timing correction.

Finally, the connecting wire for which the dummy pattern prohibition region was corrected is designated as an optical proximity correction prohibition region (S32). In optical proximity correction, as described hereinabove, expecting the occurrence of changes to the pattern, such as a change in which the ends of a narrow pattern narrow after exposure and development due to the optical proximity effect, exposure pattern data is generated by applying corrections to the designed pattern data. For example, the correction amount is determined in accordance with the width of the wiring pattern and the distance to the neighboring patterns, and the like. Thus, optical proximity correction is a processing performed in the exposure step in order to reproduce the design pattern as designed.

Meanwhile, the process shift model shown in FIG. 7 shows the relationship between the actual wiring width formed as a result of exposure, development and etching, and the dummy pattern prohibition region width, and the delay time with respect the actual wiring width is calculated to thereby perform timing correction. Therefore, there is the expectation that, if optical proximity correction is carried out in the exposure step that follows the layout step, the ultimately formed actual wiring width will not match that of the process shift model. Therefore, in the present embodiment, designation is performed to exclude those wiring patterns which have undergone timing correction in accordance with the delay value of the actual wiring, from the targets of the optical proximity correction.

After a delay time has been adjusted to thereby avoid a timing error, a timing inspection is performed once again to ascertain whether the timing error has been resolved (S14, S16). The delay time determined in step S26 is used in the timing inspection. Provided that a timing error is not generated, layout ends.

Figure 8:
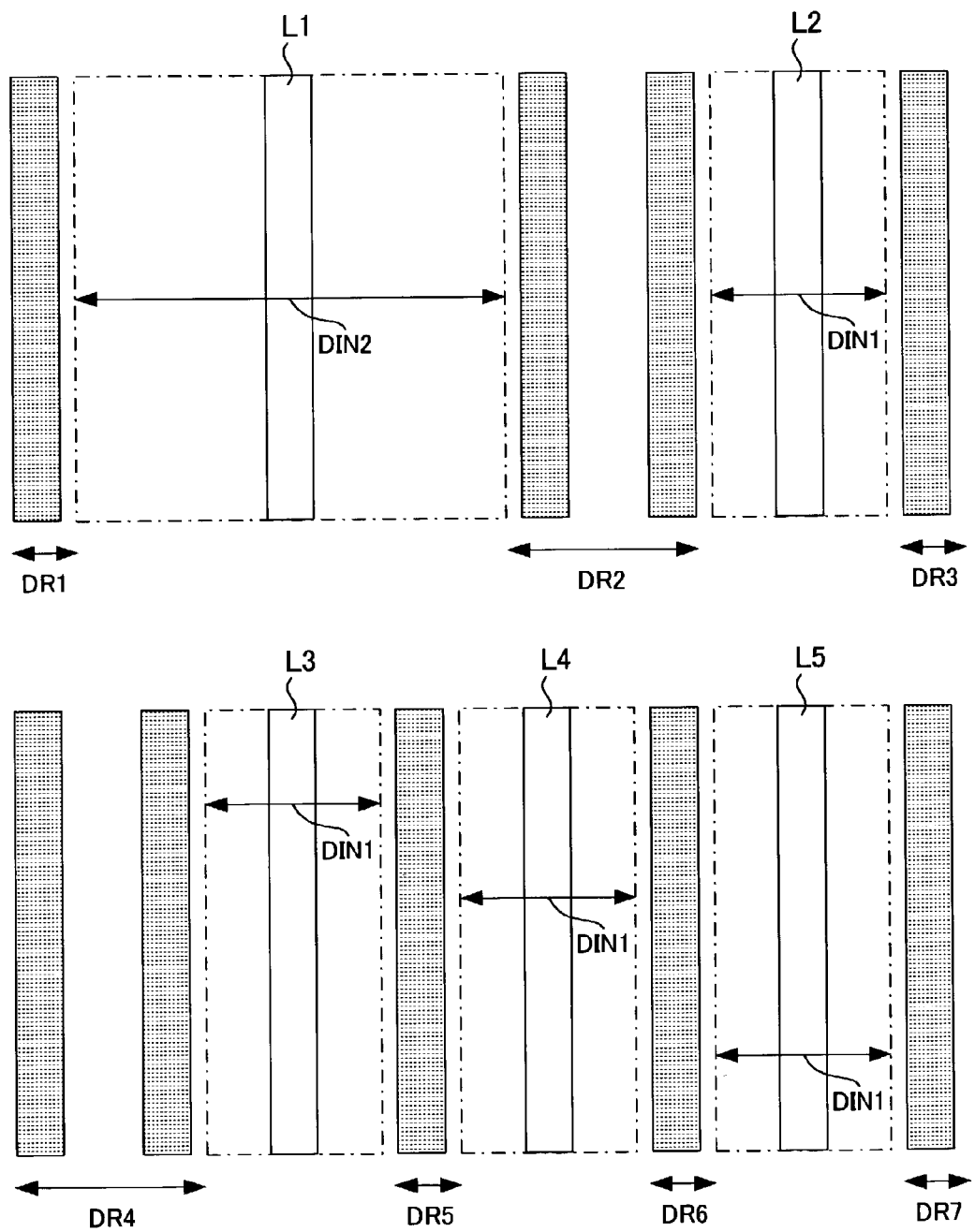
FIG. 8 serves to illustrate the connecting wires and dummy patterns in a case where the width of a dummy pattern prohibition region has been changed according to the present embodiment.
Figure 9:
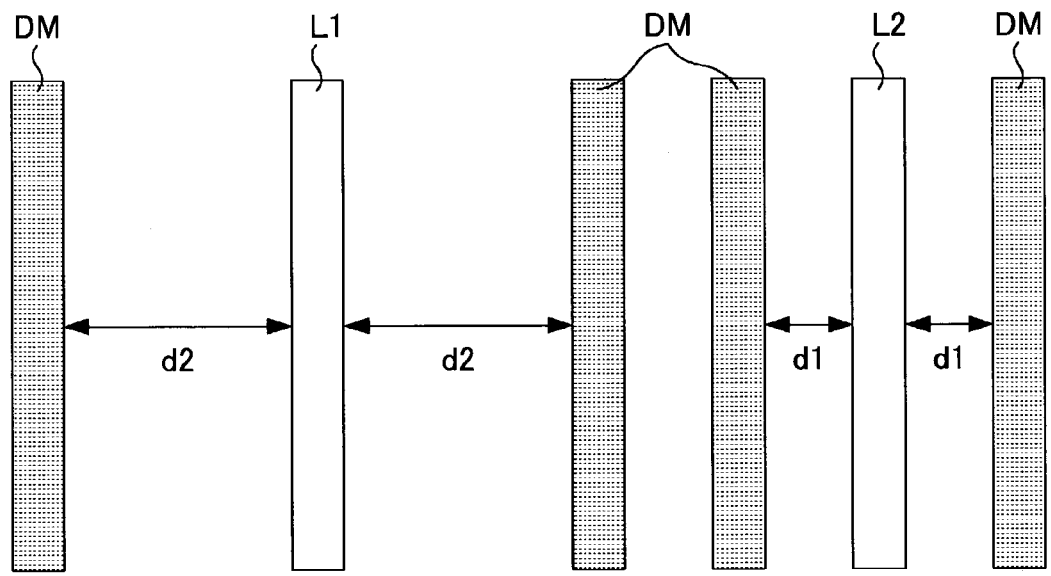
FIG. 9 serves to illustrate the connecting wires and dummy patterns in a case where the width of a dummy pattern prohibition region has been changed according to the present embodiment.
Figure 9:
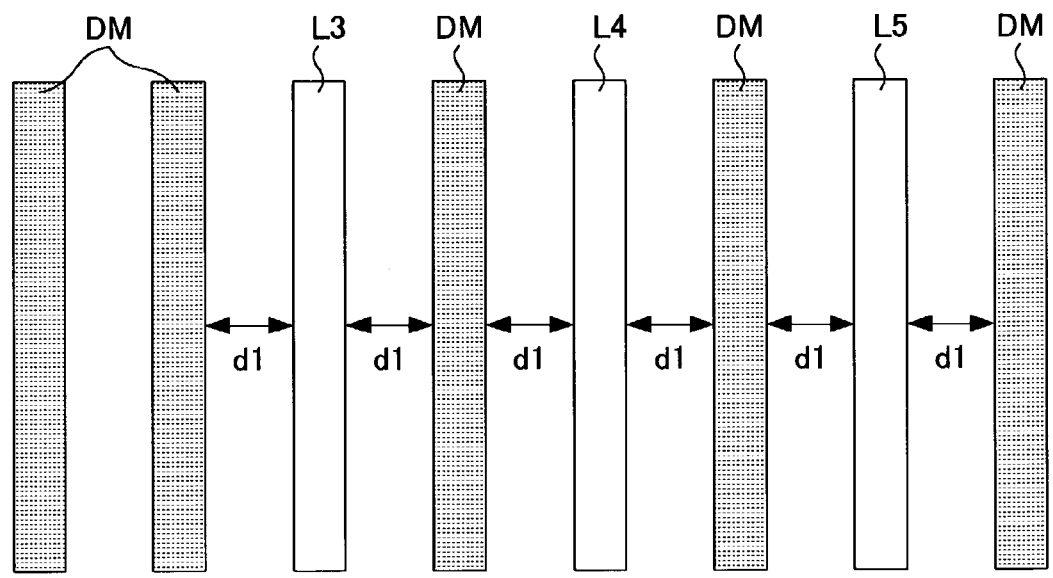

FIGS. 8 and 9 serve to illustrate the connecting wires and dummy patterns in a case where the width of a dummy pattern prohibition region has been changed according to the present embodiment. In this example, the assumption is made that a timing error is exhibited by the connecting wire L1 and therefore a minute adjustment of the delay time is necessary. A dummy pattern prohibition region width DIN2 selected in the flowchart step S22 is wider than the prohibition region width DIN1 of step S11. That is, a minute adjustment to shorten the delay time is required, meaning that an adjustment is made so that the dummy pattern prohibition region width DIN2 is enlarged and the capacitance value of the wiring L1 is reduced. Furthermore, when the dummy pattern prohibition region width is enlarged, the pattern density grows smaller, meaning that the wiring width fluctuates in dependence on this process and the resistance value thereof also changes.

As a result, as shown in FIG. 9, the wiring pattern L1 neighbors the dummy patterns DM so as to be spaced apart therefrom by the distance d2, this distance being longer than that of the other wiring patterns. In other words, despite the fact that the majority of the wiring patterns neighbor the dummy patterns so as to be spaced apart therefrom by the first distance d1, the wiring L1, which exhibited a timing error and for which an adjustment of the delay time was required, neighbors the dummy patterns so as to be spaced apart therefrom by the second distance d2 which differs from the first distance d1. Consequently, the capacitance and resistance values of the wiring L1 change, which permits correction of the delay time of the wiring L1.

As described above, an optimum distance for this second distance d2 is selected in accordance with the magnitude of the timing error, that is, in accordance with the delay time adjustment amount.

According to the embodiment described above, a wiring pattern whose dummy pattern prohibition region width has been changed is designated so as to be excluded from the targets of optical proximity correction. This is because the process shift model of FIG. 7 indicates the relationship between dummy pattern prohibition region widths and actual wiring widths in cases where design pattern data is not subjected to optical proximity correction. However, supposing that the process shift model employs a model for a case where optical proximity correction is performed, it is not necessary to perform the designation for the optical proximity correction prohibition regions of flowchart step S32. However, in such a case, the optical proximity correction of the process shift model and the optical proximity correction which is actually performed need to be the same.

According to the present embodiment, once the layout of the circuit elements, connecting wires, and the like has been performed once, the wire delay values can be adjusted without correcting the corresponding layout data. Moreover, the adjustment of these delay values can also be performed simply by changing the dummy pattern prohibition regions, that is, the distance between the wiring patterns and dummy patterns. It is thus possible to improve the overall turn-around time of the layout steps.

According to the present invention hereinabove, it is possible to minutely adjust the delay time of wiring exhibiting a timing error without repeating the layout step, whereby a shortening of the layout process turnaround time is permitted.

What is claimed is:

1. An integrated circuit layout method, comprising:
   laying out a plurality of circuit elements and a plurality of connecting wires connecting the circuit elements, on a chip;
   generating dummy patterns in regions that lie at an interval of a first distance from the connecting wires;
   performing an integrated circuit timing inspection by finding delay times of said connecting wires, after generating dummy patterns, wherein a part of the connecting wires comprises connecting wires that exhibit an error in said timing inspection; and
   changing said first distance to a second distance, that differs from said first distance, with respect to said part of the connecting wires, among said plurality of connecting wires.

2. The integrated circuit layout method according to claim 1, wherein, said changing said first distance to the second distance further comprises regenerating dummy patterns in regions that lie at an interval of the second distance from said part of the connecting wires, or deleting dummy patterns which lie at intervals up to the second distance from said part of the connecting wires.

3. The integrated circuit layout method according to claim 1, wherein, in changing said first distance to the second distance, a process shift model, which indicates a relationship between a distance from the wiring to the dummy patterns, and a wiring width formed after a fabrication process, is referenced so that a wiring width when the dummy pattern is apart from the wiring with said second distance is derived, the delay times of said part of connecting wires are found in accordance with the wiring width and the second distance, and a check is performed of whether or not the delay times make it possible to avoid a timing error.

4. The integrated circuit layout method according to claim 1, further comprising performing processing to exclude said part of connecting wires from targets of an optical proximity correction in an exposure function.

5. The integrated circuit layout method according to claim 1, wherein, after the step of changing said first distance to the second distance, said timing inspection performing step is performed once again.

6. An integrated circuit layout program, readable by a computer, that causes the computer to execute:
   laying out a plurality of circuit elements and a plurality of connecting wires connecting the circuit elements, on a chip;
   generating dummy patterns in regions that lie at an interval of a first distance from the connecting wires;
   performing an integrated circuit timing inspection by finding delay times of said connecting wires, after generating dummy patterns, wherein a part of the connecting wires comprise connecting wires that exhibit an error in said timing inspection; and
   changing said first distance to a second distance, that differs from said first distance, with respect to said part of connecting wires among said plurality of connecting wires.

7. The integrated circuit layout program according to claim 6, wherein in said changing said first distance to the second distance, dummy patterns are re-generated in regions that lie at an interval of the second distance from said part of connecting wires, or dummy patterns which lie at intervals up to the second distance from said part of connecting wires are deleted.

8. The integrated circuit layout program according to claim 6, that causes the computer to, after the procedure for changing said first distance to the second distance, execute the procedure for performing said timing inspection once again.

* * * * *